W. A. COCHRANE.
REFLECTOR.
APPLICATION FILED MAY 25, 1915.

1,251,477.

Patented Jan. 1, 1918.

Inventor:
Wilbur A. Cochrane
By Philipp, Sawyer, Rice & Kennedy
Attorneys

UNITED STATES PATENT OFFICE.

WILBUR A. COCHRANE, OF SEA CLIFF, NEW YORK.

REFLECTOR.

1,251,477.   Specification of Letters Patent.   Patented Jan. 1, 1918.

Application filed May 25, 1915. Serial No. 30,294.

*To all whom it may concern:*

Be it known that I, WILBUR A. COCHRANE, a citizen of the United States, residing at Sea Cliff, county of Queens, and State of New York, have invented certain new and useful Improvements in Reflectors, fully described and represented in the following specification and the accompanying drawings, forming a part of the same.

This invention relates to improvements in reflector devices for gas lamps, and particularly to such devices having open reflectors for use in portable acetylene lamps such, for example, as miner's cap lamps or camp lamps in which the burner produces a flame projecting in a direction parallel to the axis of the reflector.

Such lamps with the open reflectors heretofore known have readily been extinguished by drafts of air entering the front of the reflector.

The object of this invention is to provide a reflector device in which the air-drafts will be prevented from blowing out the flame.

With this general object in view a device embodying one feature of the invention comprises an open concave reflector arranged to receive a burner which gives a flame projecting in a direction generally parallel to the axis of the reflector surface, said reflector device having an annular barrier projecting forward of the reflector surface and surrounding the burner flame, this barrier serving to check and deflect outward any drafts of air flowing along the reflector surface from the outside toward the burner, the said outwardly deflected air in turn serving to check and deflect any air drafts which might otherwise act on the flame. The device also may include a chamber behind the reflector, this chamber having its interior in communication with the space within the reflector, the rear and side walls of the chamber being imperforate so that no air can enter the chamber except such as comes from the front through the reflector space. This chamber is so proportioned relative to the burner tube and burner with which it is to be used that the burner orifice opens into the chamber about the center of said chamber and an air space is formed within the chamber around the burner and in front thereof.

A device embodying all the features of the invention comprises a reflector device having a chamber around the burner tube and behind the reflector as above explained, the front of this chamber being formed by a perforated partition having a flame passage in line with the burner orifice, and air-supplying openings, whereby air may be admitted to the chamber. Owing to this arrangement it is practically impossible to extinguish the flame by any direct blast of air from the front because that portion of the flame next to the burner is within the chamber and thereby well protected against drafts.

The invention will now be more specifically described in connection with the accompanying drawings and then particularly pointed out in the claims.

In the drawings—

Figure 1:
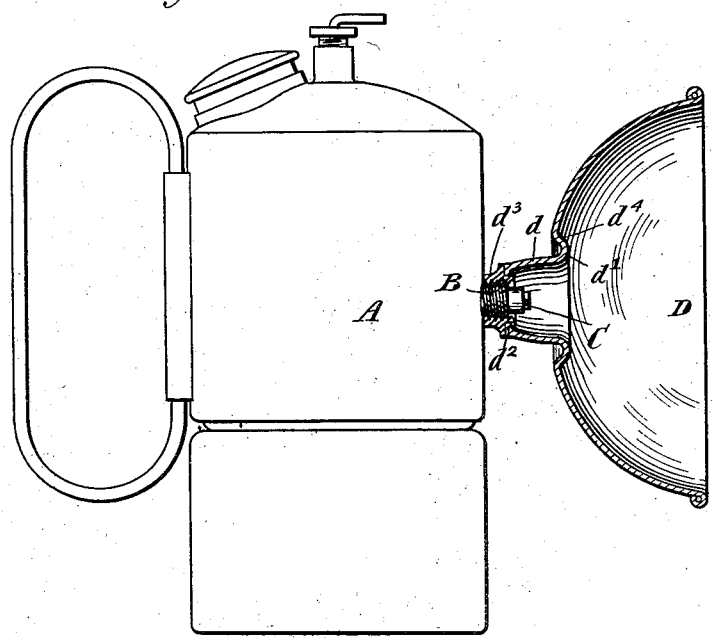
Figure 1 is a side elevation of one type of acetylene lamp provided with a reflector device embodying one form of the invention, the reflector device being in section.

Referring to Fig. 1 of the drawings, A indicates a portion of the body of a portable acetylene lamp; B is a burner tube extending therefrom and C the burner carried by the burner tube.

At D is indicated a reflector, which in the present example is made of sheet metal with its interior surface suitably finished, as for example by plating it, to form a reflecting surface. It is usual to form such reflectors with deep parabolic reflecting surfaces, or to make them shallow with various curvatures, but in the present example the reflecting surface is spheroidal and of considerable depth, that is to say, the reflecting surface is almost a hemisphere. At the back of the reflector a chamber is formed, this chamber being so proportioned as to receive the burner of the lamp and leave a space around the burner and in front of it. In the present example, the mouth of the burner orifice opens approximately at the center of the chamber. In this embodiment of the invention the front end of the chamber is open. Around the front end of the chamber is arranged a baffle device projecting forward beyond the reflector surface and so arranged that any drafts of air flowing along the reflector surface from the outer open end of the reflector toward the center, will encounter the baffle device and be deflected outward.

In this embodiment of the invention the chamber walls and the baffle device are formed in one piece with the reflector, by depressing a portion of the reflector to form a chamber circular in cross section, whose wall is indicated at $d$, and by forming the baffle device as an annular bead, $d'$, projecting forward from the reflector surface and surrounding the open forward end of the chamber.

The back wall of the chamber consists of a portion of the side wall flanged inward, as shown at $d^2$, and united, as by soldering, to a nipple $d^3$, which is arranged to be fitted onto the burner tube. In the example shown the nipple and the burner tube are provided with screw-threads so as to prevent accidental removal of the reflector. It will be noted that the side walls and back wall of the reflector are imperforate so that no air can reach the burner except from the front of the chamber.

It is advantageous to so arrange the baffle-device that air currents directed to it by the reflector surface will not merely be stopped but will be changed in direction and forced outward. This is done in the present example by giving the outer wall or deflecting surface of the annular bead an incline as shown at $d^4$, whereby air-currents striking it are deflected toward the axis of the reflector but intercept said axis at an appreciable distance in front of the reflector surface.

As a result of the baffle device, any drafts of air striking the reflector surface follow it inward toward the burner until they impinge upon the inclined outer wall of the baffle device, and then are forced outward away from the flame. Furthermore the currents of air deflected outward by the baffle device meet and tend to oppose any blasts of air moving directly toward the flame from the open end of the reflector.

By this construction the flame cannot be injuriously affected either by air currents first striking the reflector wall or by air currents coming straight toward the flame.

Owing to the fact that the burner orifice terminates within the chamber and back of the reflector surface, the back end of the flame where it issues from the burner is so protected against air movements that it is practically impossible to extinguish the flame accidentally. As the burner is surrounded by a considerable space there is a sufficient supply of air to the burner to maintain a proper combustion.

Figure 2:
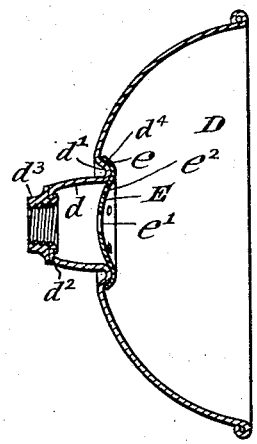
Fig. 2 is sectional view of another form of reflector device embodying the invention.
Figure 3:
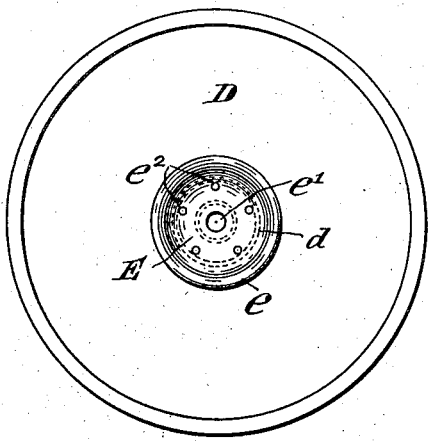
Fig. 3 is a front view of the same.

The embodiment of the invention shown in Figs. 2 and 3 differs from that already described in that the front end of the chamber is closed by a wall which has an opening in line with the burner orifice, through which the flame may project into the space within the reflector. This wall also has restricted openings for permitting air to flow into the chamber to supply oxygen to the gas, the restricted size of the openings tending to check sudden drafts through the openings.

In the example illustrated in Figs. 2 and 3 the front wall of the chamber consists of a cap or disk E, having its margin flanged backward at an incline to fit onto the annular bead, this flanged portion $e$ reaching to the reflector surface. This cap may be secured in place by soldering it to the annular bead. It will be noted that in this construction the outer surface of the cap flange constitutes the baffle device. The central portion of the cap E which covers the front end of the chamber may be cupped or dished backward and has a flame orifice $e'$ in line with the burner orifice, and also has a plurality of air holes, indicated at $e^2$ surrounding the flame orifice. In this construction the front surface of the cap E may also be made as a reflecting surface, as, for example, by polishing and plating it.

Figure 4:
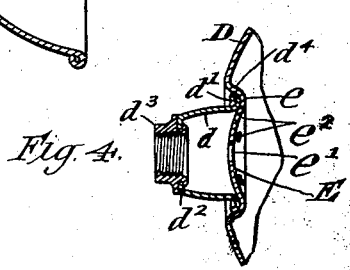
Fig. 4 is a detail view illustrating another construction of the device shown in Figs. 2 and 3.

Instead of making the chamber by depressing the metal of the reflector, the baffle device and perforated front wall of the chamber may be made in one piece with the reflector and the chamber made as a separate cup soldered to the back of the reflector as shown in Fig. 4.

What is claimed is:

1. A reflector device for gas lamps comprising a reflector, a burner-receiving chamber back of the reflector, and having imperforate walls, said chamber having its interior in communication with the space within the reflector, a baffle-device around the front end of the chamber and projecting forward from the reflector, said baffle-device having a sloping wall arranged to deflect air drafts from the front toward the front, and means for attaching the reflector device to a burner.

2. A reflector device for gas lamps comprising a reflector having an annular forwardly and inwardly sloping portion forming a baffle device, a burner-receiving chamber back of the reflector and having its interior in communication with the space within the reflector, the said baffle device surrounding the front end of the chamber, and arranged to deflect air drafts from the front toward the front, and means for attaching the reflector to a burner.

3. A reflector device for gas lamps, comprising a reflector having a reflector surface and an opening through which a flame may enter the reflector space, said reflector having a portion formed as a baffle-device around said opening and projecting forward a substantial amount from the reflector surface, the exterior wall of said portion sloping toward the axis of the reflector and in a forward direction.

4. A reflector device for gas-lamps, comprising a reflector, a burner-receiving chamber behind the reflector and having a front wall provided with a flame orifice and with air-passages, and means for attaching the reflector device to a burner.

5. A reflector device for gas-lamps comprising a reflector, a burner-receiving chamber behind the reflector and having a front wall provided with a flame orifice and with air passages, a baffle device surorunding the said flame orifice and projecting forward beyond the reflector surface, and means for attaching the reflector device to a burner.

6. The combination with a burner-tube and a burner, of a reflector device, comprising a reflector, a burner-receiving chamber into whose interior the orifice of the burner opens, the interior of the chamber being in communication with the space within the reflector whereby the flame may enter the reflector space, a baffle device at the rear portion of the reflector and projecting forward from the reflector surface, and means for attaching the reflector device to the burner-tube.

In testimony whereof, I have hereunto set my hand in the presence of two subscribing witnesses.

WILBUR A. COCHRANE.

Witnesses:
A. WHITE,
J. F. DONOVAN.